United States Patent
Pedruzzi et al.

(10) Patent No.: US 10,878,835 B1
(45) Date of Patent: Dec. 29, 2020

(54) SYSTEM FOR SHORTENING AUDIO PLAYBACK TIMES

(71) Applicant: AMAZON TECHNOLOGIES, INC., Seattle, WA (US)

(72) Inventors: Pedro Rodrigues Nacione Pedruzzi, Sao Paulo (BR); Marcos Vinicius Romero, Sao Paulo (BR); Gabriel Pereira Borges, Sao Paulo (BR); Arthur Silva Freire, Campina Grande (BR); Rafael Jessen Werneck De Almeida Martins, Sao Paulo (BR)

(73) Assignee: AMAZON TECHNOLOGIES, INC, Seattle, WA (US)

( * ) Notice: Subject to any disclaimer, the term of this patent is extended or adjusted under 35 U.S.C. 154(b) by 94 days.

(21) Appl. No.: 16/193,307

(22) Filed: Nov. 16, 2018

(51) Int. Cl.
*G10L 21/043* (2013.01)
*G10L 15/22* (2006.01)
*G10L 15/02* (2006.01)

(52) U.S. Cl.
CPC ............ *G10L 21/043* (2013.01); *G10L 15/02* (2013.01); *G10L 15/22* (2013.01); *G10L 2015/025* (2013.01)

(58) Field of Classification Search
CPC ....... G10L 21/043; G10L 15/02; G10L 15/22; G10L 2015/025; G10L 21/04; G10L 21/045; G10L 21/047; G10L 21/049; G10L 21/055; G10L 21/057; G10L 21/0272; G10L 19/012; G10L 25/78; G10L 25/87; G10L 2025/783; G10L 2025/786; G11B 27/005; G11B 27/007
See application file for complete search history.

(56) References Cited

U.S. PATENT DOCUMENTS

| 5,305,420 A | * | 4/1994 | Nakamura | G09B 19/04 704/208 |
| 5,611,018 A | * | 3/1997 | Tanaka | G10L 21/04 704/215 |
| 2002/0010916 A1 | * | 1/2002 | Thong | H04N 5/278 725/1 |
| 2004/0015345 A1 | * | 1/2004 | Megeid | G10L 21/01 704/207 |
| 2004/0068412 A1 | * | 4/2004 | Chu | G10L 21/04 704/503 |
| 2005/0055204 A1 | * | 3/2005 | Florencio | G10L 21/04 704/233 |

(Continued)

*Primary Examiner* — Andrew C Flanders
(74) *Attorney, Agent, or Firm* — Lindauer Law, PLLC

(57) ABSTRACT

Techniques for reducing the time used to output audio or video include increasing the output rate for portions of the content to reduce the time needed for a user to consume the content. Audio data is analyzed to determine portions that are silent and portions that include speech, such as by determining amplitude and other signal characteristics. Portions that include speech are analyzed to determine an initial rate of speech associated with each portion. Speech characteristics of the portions, such as language, volume, and pitch are used to determine a target maximum comprehensible rate of speech for a user. When audio output is generated, the portions that represent speech are each output at a rate that results in the speech being presented within a threshold of the target rate. The portions that represent silence may be removed, shortened, or output at a faster rate than the portions that represent speech.

20 Claims, 7 Drawing Sheets

(56) References Cited

U.S. PATENT DOCUMENTS

| | | | |
|---|---|---|---|
| 2006/0293883 A1* | 12/2006 | Endo | G10L 21/04 704/219 |
| 2007/0211704 A1* | 9/2007 | Lin | G10L 19/167 370/356 |
| 2007/0265839 A1* | 11/2007 | Sasaki | G10L 21/045 704/201 |
| 2008/0235010 A1* | 9/2008 | Takahashi | G10L 21/01 704/224 |
| 2008/0267224 A1* | 10/2008 | Kapoor | H04L 49/90 370/516 |
| 2008/0279528 A1* | 11/2008 | Takahashi | H04N 5/783 386/248 |
| 2008/0304678 A1* | 12/2008 | Chen | G10L 21/04 381/71.12 |
| 2011/0029317 A1* | 2/2011 | Chen | G10L 19/22 704/500 |
| 2013/0325456 A1* | 12/2013 | Takagi | G10L 21/04 704/210 |
| 2016/0171990 A1* | 6/2016 | Reuschl | G10L 21/04 704/503 |
| 2017/0064244 A1* | 3/2017 | Abou Mahmoud | H04N 5/7605 |
| 2018/0350388 A1* | 12/2018 | Jain | H04N 9/8205 |

* cited by examiner

SYSTEM FOR SHORTENING AUDIO PLAYBACK TIMES

BACKGROUND

Audio and video content may be output at various rates based on the speed at which a user selects to experience the content. However, manual variation of an output rate to

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
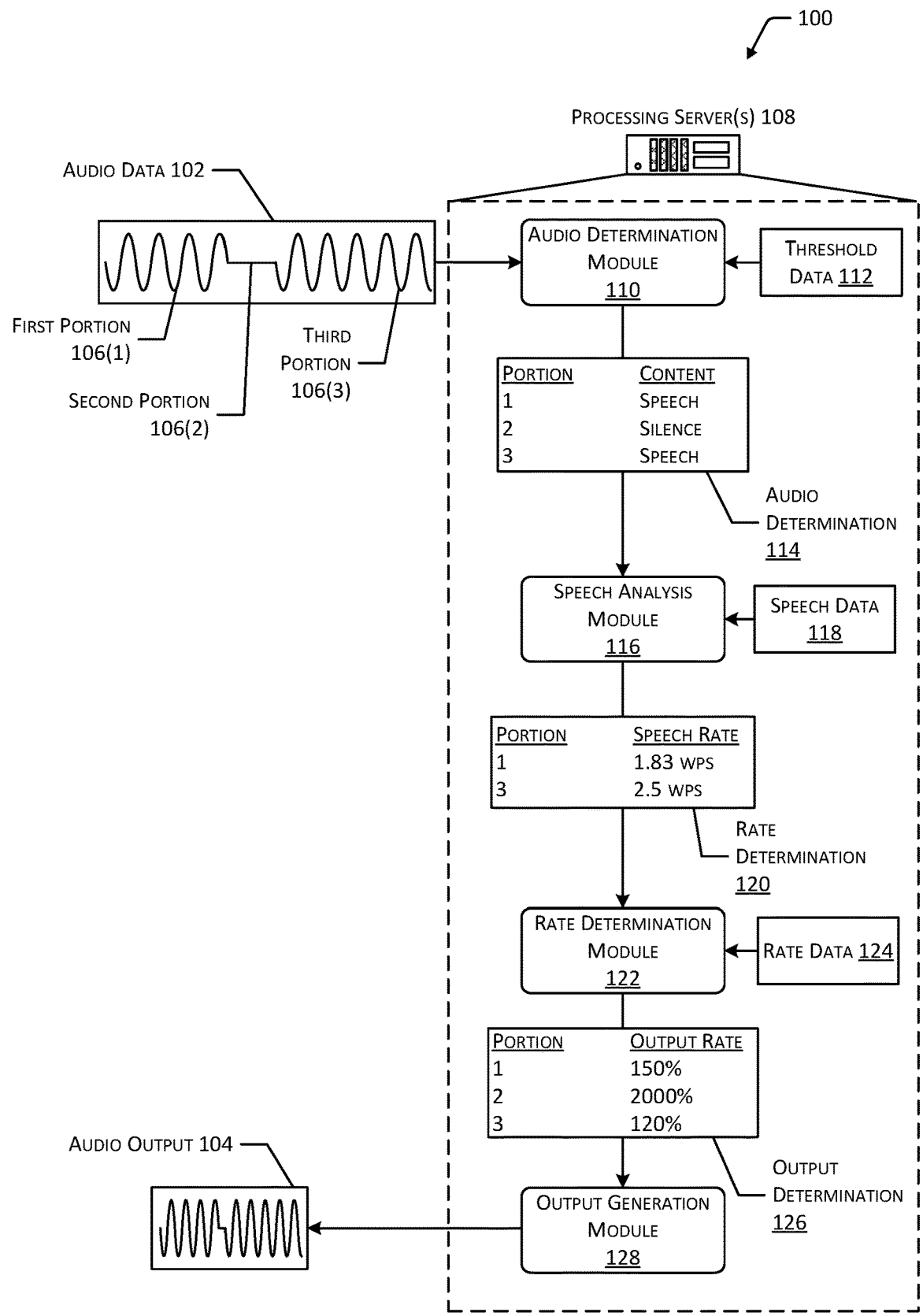
FIG. 1 depicts an implementation of a system for processing audio data associated with a first playback time to generate audio output having a second playback time shorter than the first playback time.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

When an audio recording device is used to record speech or other sounds, or a video recording device is used to record a scene, an audio data file or video data file may be generated. Subsequently, the audio data file or video data file may be used to generate output. For example, audio data may be provided to an audio output device, which may generate audio based on the content represented by the audio data. In some cases, the rate at which the content is output by the output device may be identical to, or within a threshold tolerance of, the rate at which the content was recorded using a recording device. For example, output representing recorded speech may be presented at the same rate that the speaker originally uttered the speech. In other cases, the rate at which content is output may be varied. For example, an output device may be configured to present content at a default output rate that is identical to, or within a threshold tolerance of, the rate at which the original content was recorded. A user may provide user input to cause an output device to present audio or video content at 150% of the default output rate, 200% of the default output rate, or other output rates that may be greater or less than the default output rate. For example, a user may wish to experience content quickly, such as during times when the user's available time to consume content is limited, or when consuming types of content for which the rate at which the content is presented does not significantly hinder the user's acquisition of information based on the content.

However, in some cases, manual selection of accelerated output rates for audio or video content by a user, or automatic application of a single output rate for content, may cause portions of the content to become incomprehensible. For example, an individual uttering speech may speak rapidly when uttering certain phrases and more slowly when uttering other phrases, such that outputting rapidly-spoken phrases at an accelerated output rate causes the phrases to become incomprehensible. As another example, an individual uttering speech may not annunciate certain phrases clearly, may speak with a lower or higher pitch, or may utter speech in a language or dialect that is more difficult to comprehend when output at an accelerated rate. In each of these cases, use of an accelerated output rate with regard to certain portions of an audio data file may result in comprehensible output, while use of the same accelerated output rate with regard to other portions of the audio data file may result in incomprehensible output. Additionally, in some cases, manual selection of accelerated output rates for audio or video content by a user, or automatic application of a single output rate for content, may fail to fully optimize the playback time for audio or video content. For example, recorded audio may include one or more periods of silence. Playback of a period of silence at an output rate that would enable comprehension of speech may result in the output of silence for an inefficient length of time when a user is attempting to consume content quickly.

Described in this disclosure are techniques for reducing the playback time used to output audio content, and in some cases video content, by dynamically modifying the output rate associated with the content. An audio data file may be generated by recording audio content. In other implementations, audio data may be provided from an audio data source for contemporaneous output (e.g., streaming). The audio data file may be provided to an output device to cause the output of audio during a first output time (e.g., an initial playback time) when the audio is output at a first (e.g., default) audio output rate. For example, a default audio output rate may include an output rate that is within a threshold tolerance of the rate at which the audio content was originally recorded, such that playback of the audio data file occurs during the first output time. To reduce the output time associated with playback of the audio data file, a first portion of the audio data file that represents speech and a second portion of the audio data file that represents non-speech may be determined. In some implementations, non-speech may include silence, which may include portions of the audio data file corresponding to an amplitude or other measurement of an audio signal that is less than a threshold value. Non-speech may also include sound other than spoken phonemes.

In some implementations, portions of the audio data file that correspond to silence or other non-speech may be prevented from playback, such as by skipping the portions that correspond to silence or non-speech when generating audio output. In other implementations, portions that correspond to silence or other non-speech may be shortened, such as by skipping or preventing playback of at least a portion of the silence or non-speech. In still other implementations, portions that correspond to silence or other non-speech may be prevented from playback and other content, such as a brief interval of silence, may be output in place of the omitted content. In other cases, a second audio output rate may be determined for output of the portions of the audio data file associated with silence or other non-speech. For example, portions of the audio data file that correspond to non-speech may be output at a highly accelerated output rate to significantly shorten the time used to output silence or non-speech.

Portions of the audio data file that correspond to speech may be output at an audio output rate that is greater than the default output rate, but less than the highly accelerated output rate associated with silence or non-speech. In some implementations the audio output rate used to output the portions that correspond to speech may be selected based on characteristics of the speech. For example, an initial rate of speech uttered by a speaker may be determined based on the audio data. A target rate of speech, such as a maximum rate of speech that would be comprehensible to a human user, may be determined. The output rate of the speech may be determined based on a relationship between the initial rate and the target rate. For example, the output rate for the speech may be selected such that when the speech is output, it is output at the target rate. Continuing the example, if a target rate of speech is 5 words per second, and a speaker initially utters speech at a rate of 2.5 words per second, the output rate for the speech may be 200% of the default rate for outputting the audio data.

In some implementations, the target rate of speech may be determined based on characteristics of the speech. For example, a target rate of 5 words per second may be comprehensible for speech in a first language, but less comprehensible for speech in a second language. As such, the target rate of speech for the second language may be less than the target rate of speech for the first language. In some cases, a target rate of speech for a language may be determined based on user input. For example, a user that is fluent in English and less familiar with Spanish may input a target rate of 5 words per second for English speech and a target rate of 3 words per second for Spanish. As another example, a first target rate of speech may be comprehensible for speech uttered with a higher frequency or pitch but less comprehensible for speech uttered with a lower frequency or pitch, and the target rate of speech for lower frequencies or pitches may be less than that for higher frequencies or pitches. As yet another example, characteristics of a speaker's annunciation may be used to determine the target rate of speech. For example, a user suffering from a cold may speak less clearly than another user, and the target rate of speech for that user may be decreased based on the characteristics of the user's annunciation.

In some implementations, speech that is output may, itself, be used as input for determining a target rate of speech for subsequent portions of the speech. For example, a portion of audio data that includes speech may initially be output at a first rate, and characteristics of the output may be used to determine a target rate of speech for outputting subsequent portions of the speech. In such cases, characteristics of the initial audio data may not necessarily be determined and used to select an output rate, and instead, characteristics of the speech that is output may be determined and used for this purpose.

In some implementations, the output rate determined for output of speech may be analyzed using natural language processing or speech to text techniques to determine the comprehensibility of the speech. For example, speech that is output at an accelerated rate may be used to generate text or other data indicative of the speech, and this data may be compared to language data indicative of valid linguistic phonemes. If the accelerated speech primarily includes valid linguistic phonemes, the speech may be determined to be comprehensible. However, if more than a threshold portion of the accelerated speech does not correspond to valid linguistic phonemes, this may indicate that the speech is not comprehensible, and the output rate may be decreased to improve comprehensibility of the speech. In other implementations, user input may be used to indicate portions of an output that are not comprehensible, and the output rate associated with those portions may be decreased in response to the user input. In some cases, user input may be used to modify the output rate for portions of an output subsequent to automatic generation of an audio output having an initial output rate. For example, a user may edit the output rate or other characteristics of one or more portions of an audio output subsequent to generation of the audio output using implementations described herein.

In some cases, different portions of speech may be output using different output rates. For example, a first sentence uttered by a speaker may be uttered at a first rate of speech, while a second sentence is uttered at a faster rate of speech. The output rate used for the second sentence may be slower to maintain comprehensibility of the speech. As another example, different sentences uttered by a speaker may be uttered in different languages or annunciated differently. As yet another example, an audio output may include speech uttered by multiple speakers, and different voices may speak at different rates with different characteristics. Different output rates may be used for portions of the audio data that correspond to different speakers. Additionally, in some cases, to preserve the natural feel of speech when output at an accelerated rate, pauses within the speech may be output. For example, if a portion of audio data is determined to correspond to a pause within speech rather than a lengthy period of silence, such as a period of silence that immediately follows a sound, having a length less than a threshold length of time, the pause may be output using the output rate determined for the speech. In other cases, the pause may be output at a rate greater than the output rate determined for the speech, but less than the output rate used to output silent portions of the audio data.

In some implementations, the determined output rates may be provided to an output device to cause respective portions of an audio data file to be output at the determined output rate for each portion. In other implementations, a device transmitting audio data for contemporaneous output (e.g., streaming) may transmit the audio data in a manner that will cause audio output to be provided at the determined output rates. In still other implementations, the determined output rates may be used to generate an audio data file having a shorter playback time due to the rate at which each portion is output.

As one skilled in the art will appreciate in light of this disclosure, certain embodiments may be capable of achieving certain advantages, including some or all of the following: automatic and dynamic adjustment of the output rate for audio, and in some cases video, may optimize the rate at which a user may consume content, while maintaining comprehensibility of the output and without requiring user input or manual manipulation of the output rate. Dynamic modification of an output rate may prioritize important content, such as spoken words, while removing or deprioritizing less important content, such as silence or non-speech sounds. Additionally, implementations described herein may automatically preserve the natural sound and flow of speech, such as by identifying and preserving pauses in speech, inflections, and variations in rate of speech within a single sentence or phrase. Automatic and dynamic modification of an output rate for audio or video content may also reduce computation resources used to receive user input and modify output based on the user input. For example, if an initial audio output rate is too fast for comprehension or too slow to maximize content consumption, additional user input and modification of the audio rate in response to the user input may consume time and computational resources.

FIG. 1 depicts an implementation of a system 100 for processing audio data 102 associated with a first playback time to generate audio output 104 having a second playback time shorter than the first playback time. Audio data 102 may include any type of data that may be provided to an output device or other type of computing device to cause the output device to generate sound (e.g., audio output 104) based on the audio data 102. In some implementations, the audio data 102 may include an existing (e.g., recorded) audio file. In other implementations, the audio data 102 may be transmitted to the system 100 from a data source for contemporaneous output (e.g., streaming). The audio data 102 may include data indicating a particular frequency, amplitude or other sound characteristics, that are associated with a sound to be output at a particular time. For example, audio data 102 may include data representing speech, music, or any other type of sound. In some cases, one or more portions 106 of the audio data 102 may correspond to a period of silence. For example, audio data 102 may represent periods of speech or other types of sound that are separated by a period of silence. FIG. 1 depicts example audio data 102 that includes a first portion 106(1) that corresponds to speech, a second portion 106(2) that corresponds to silence, and a third portion 106(3) that corresponds to speech. While FIG. 1 depicts the audio data 102 representing a waveform for illustrative purposes, the audio data 102 may include any manner of analog, digital, or other type of data configured to cause an output device to generate sound. As used herein, the term "silence" may not necessarily indicate an absolute lack of sound, but may instead indicate a portion 106 of the audio data 102 in which the amplitude associated with one or more frequencies within the human audible range (e.g., from 20 Hz to 20,000 Hz) is less than a threshold value. For example, portions of the audio data 102 that correspond to generally soft background noises in an environment associated with an individual delivering a speech, during times when the individual is not speaking, may be determined to include "silence" independent of the low-amplitude noises represented by the audio data 102.

In some cases, a user that wishes to consume content associated with the audio data 102 may wish to experience the content at a faster rate, such as when the user's available time to listen to the audio output 104 is limited or when the user desires to experience the content as efficiently as possible. For example, audio data 102 representing an educational speech may be output at a faster rate than the speech was initially recorded without preventing comprehension of the speech by a user. In such a case, the output rate for outputting the audio output 104 may be increased from the default output rate associated with the audio data 102. For example, the audio data 102 may be associated with a default output rate that causes generation of audio output 104 at a rate identical or within a threshold similarity of the initial rate at which the audio content was recorded to generate the audio data 102. Output of the audio output 104 at an accelerated rate may enable the content associated with the audio data 102 to be experienced over a shorter length of time than the default output rate associated with the audio data 102.

One or more processing servers 108 may receive the audio data 102 and process the audio data 102 to generate audio output 104 having a shorter playback time than that associated with the initial audio data 102. While FIG. 1 depicts the processing server(s) 108 as a single server, the processing server(s) 108 may include any number and any type of computing device including, without limitation, servers, portable or mobile computing devices, personal computers, wearable computing devices, automotive computing devices, media devices, and so forth.

An audio determination module 110 associated with the processing server(s) 108 may determine portions 106 of the audio data 102 that represent speech, silence, other sounds (e.g., non-speech), and so forth. Identification of the content associated with a portion 106 of the audio data 102 may facilitate determining a suitable output rate for each portion 106. For example, a portion 106 of the audio data 102 that represents silence may be output at a highly accelerated rate without hindering comprehension of audio content by a user, while a portion 106 that represents speech may be output at an accelerated rate that remains slow enough to enable comprehension of the audio output 104 by a user. The audio determination module 110 may access threshold data 112 indicative of one or more characteristics of audio data 102 that may be used to determine portions 106 that correspond to speech, silence, or other non-speech sounds. For example, the threshold data 112 may indicate a threshold amplitude for one or more frequencies within the human audible range. If a portion 106 of the audio data 102 does not correspond to an amplitude that exceeds the threshold amplitude, this portion 106 may be determined to include silence. If a portion 106 of the audio data 102 corresponds to an amplitude that is greater than or equal to the threshold amplitude, this portion 106 may be determined to include sound. In some implementations, the threshold data 112 may include one or more other signal characteristics that indicate speech or non-speech noises. For example, correspondence between the audio data 102 and the threshold data 112 may indicate that a particular portion 106 of the audio data 102 represents speech, rather than other non-speech sounds. The audio determination module 110 may generate an audio determination 114 indicative of the content associated with one or more portions 106 of the audio data 102. For example, FIG. 1 depicts the audio determination 114 indicating that the first portion 106(1) and third portion 106(3) of the audio data 102 represent speech, while the second portion 106(2) represents silence.

A speech analysis module 116 associated with the processing server(s) 108 may analyze the portions 106 of the audio data 102 that represent speech to determine characteristics of the speech. For example, the speech analysis module 116 may determine correspondence between the particular portions 106 of the audio data 102 that represent speech and speech data 118. The speech data 118 may associate signal characteristics of the audio data 102 with corresponding characteristics of the speech represented by the audio data 102. For example, the speech data 118 may indicate characteristics of the audio data 102 that are indicative of a rate of speech, a spoken language, a frequency or pitch of the speech, an annunciation of the speech, and so forth. Continuing the example, characteristics of the audio data 102 used to determine a rate of speech represented by the audio data 102 may include a sample rate of the audio data 102, a zero crossing rate of the audio data 102, or other characteristics 102, such as a rate at which the frequency or amplitude of a signal represented by the audio data 102 varies to indicate the times at which spoken words or syllables are uttered. A determined initial rate of speech for the audio data 102 may be expressed as words per unit of time, syllables per unit of time, phonemes per unit of time, and so forth. FIG. 1 depicts the speech analysis module 116 generating a rate determination 120 indicative of a rate of speech associated with selected portions 106 of the audio data 102. Specifically, FIG. 1 illustrates the example audio data 102 including a first portion 106(1) representing speech having a rate of 1.83 words per second (WPS), and a third portion 106(3) representing speech having a rate of 2.5 words per second (WPS). In other implementations, in addition to or in lieu of the rate determination 120, the speech analysis module 116 may determine other characteristics of speech, such as an associated language, or a pitch or frequency uttered by a speaker.

A rate determination module 122 associated with the processing server(s) 108 may determine an output rate to be used to output one or more portions 106 of the audio data 102. For example, based on the initial rate of speech indicated in the rate determination 120, the rate determination module 122 may determine an output rate that may be used to output a particular portion 106 of the audio data 102 at a target rate of speech. The rate determination module 122 may access rate data 124, which may associate target rates of speech with speech characteristics determined by the speech analysis module 116. For example, the rate data 124 may associate particular languages with target rates of speech that may maximize the rate of consumption of audio output 104 while maintaining comprehensibility of the language. As another example, the rate data 124 may associate other speech characteristics, such as pitch, volume, annunciation, and so forth, with corresponding target rates of speech. Continuing the example, the rate data 124 may include one or more equations or algorithms that determine a target rate of speech based on various characteristics of recorded speech, such as the pitch, volume, and language associated with the speech. Based on the relationship between the initial rate of speech indicated in the rate determination 120 and a target rate of speech indicated in the rate data 124, the rate determination module 122 may generate an output determination 126 indicative of an output rate for one or more portions 106 of the audio data 102. In some implementations, the rate data 124 may also indicate particular target output rates for portions of the audio data 102 that correspond to silence or to sounds other than speech.

For example, the rate data 124 may indicate that a target maximum rate of speech that may be comprehended by an end user is 5 words per second. Based on the relationship between the initial rate of speech determined for the first portion 106(1) and the third portion 106(3) and the target rate of speech, the rate determination module 122 may generate an output determination 126 indicating an output rate for the first portion 106(1) and third portion 106(3) that will cause output of the speech at or within a threshold variance of the target rate of speech. Additionally, the rate data 124 may indicate that portions 106 of the audio data 102 that represent silence may output at an output rate of 20 times the default output rate associated with the audio data 102. The output determination 126 may also indicate the output rate associated with portions 106(2) of the audio data 102 that correspond to silence. In some implementations, portions 106 of the audio data 102 that correspond to sound other than speech may be output at the same output rate as portions 106 that correspond to silence. In other implementations, the portions 106 that correspond to sound other than speech may be output at the same output rate as portions 106 that correspond to speech. In still other implementations, the portions 106 that correspond to sound other than speech may be output at an output rate that differs from the output rate for portions 106 that correspond to speech or to silence, such as an output rate that is greater than the output rate used for speech but less than the output rate used for silence.

An output generation module 128 may generate audio output 104 based on the output determination 126 and the audio data 102. In the audio output 104, one or more portions 106 of the audio data 102 may be output at an accelerated output rate relative to the default output rate(s) for the audio data 102, based on the output rate indicated in the output determination 126. As a result, the audio output 104 may be presented with a shorter playback time than the playback time associated with the initial audio data 102 if the audio is output using a default output rate that corresponds to the rate at which the audio content was recorded.

Figure 2:
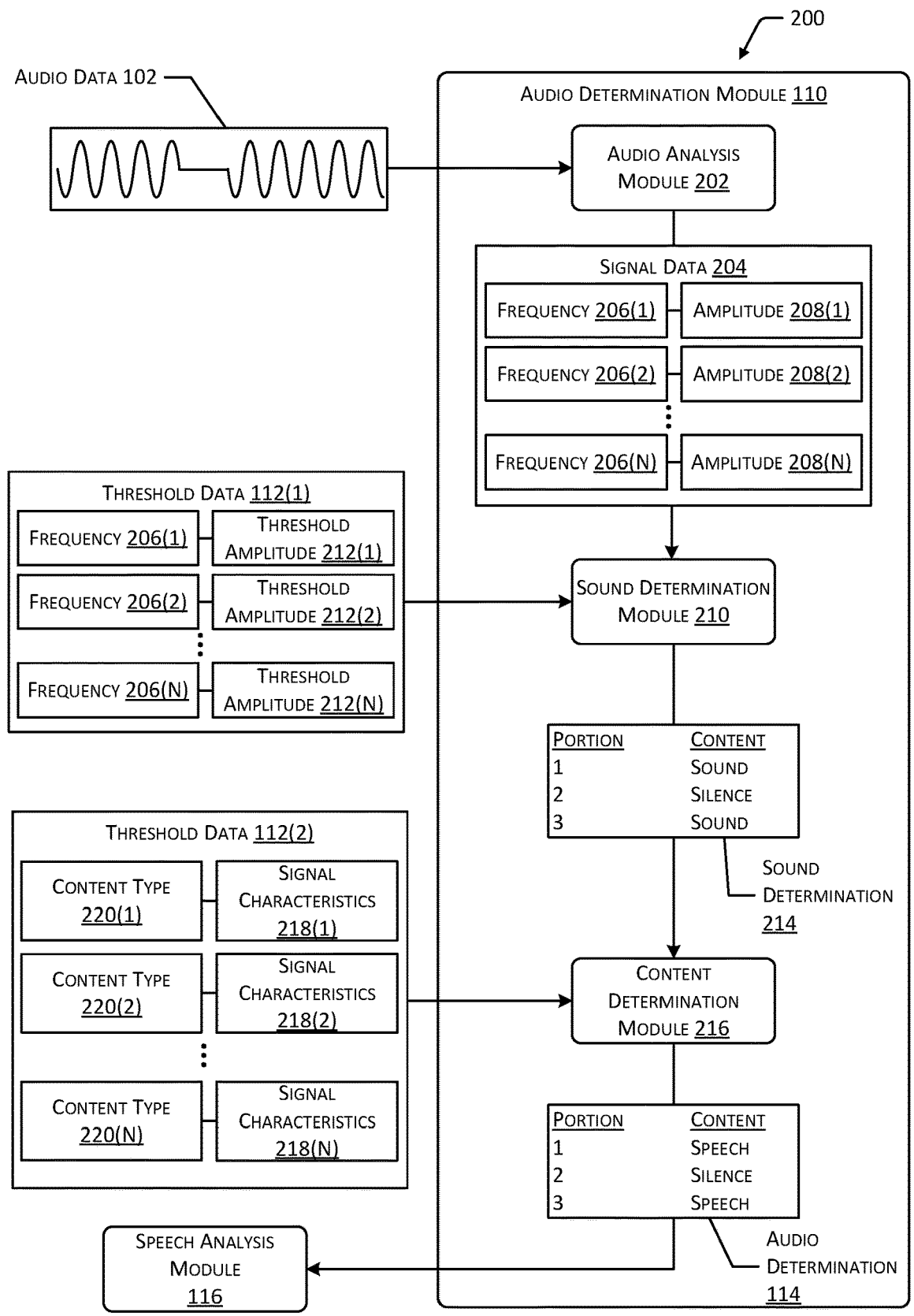
FIG. 2 depicts an implementation of a system for determining the content associated with audio data.

FIG. 2 depicts an implementation of a system 200 for determining the content associated with audio data 102. As described with regard to FIG. 1, an audio determination module 110 associated with the processing server(s) 108 may generate an audio determination 114 indicative of the audio content represented by audio data 102. For example, audio content may include speech, silence, or other non-speech sounds.

An audio analysis module 202 associated with the audio determination module 110 may receive audio data 102 and determine characteristics of the audio data 102. Characteristics of the audio data 102 may include one or more signal characteristics associated with the audio data 102 at one or more frequencies. For example, the audio analysis module 202 may generate signal data 204 indicative of the audio data 102. The signal data 204 may associate one or more frequencies 206 of the signal represented by the audio data 102 at a given time with a corresponding signal characteristic, such as an amplitude 208 of the signal at the corresponding frequency 206. Continuing the example, FIG. 2 depicts example signal data 204 that associates a first frequency 206(1) of the audio data 102 with a first corresponding amplitude 208(1), a second frequency 206(2) with a second amplitude 208(2), and any number of additional frequencies 206(N) with corresponding amplitudes 208(N). The signal data 204 may also associate each frequency 206 and amplitude 208 with a corresponding time. For example, at a given moment, a signal represented by the audio data 102 may include sound at multiple frequencies 206, the sound for each frequency 206 having a respective amplitude 208. The amplitude 208 of the sound for each frequency 206 may vary over time. While FIG. 2 depicts the signal data 204 associating frequencies 206 with corresponding amplitudes 208, in other implementations, the signal data 204 may associate other characteristics of the audio data 102.

A sound determination module 210 associated with the audio determination module 110 may determine portions 106 of the audio data 102 that correspond to sound, and other portions 106 of the audio data 102 that correspond to silence. For example, the sound determination module 210 may determine correspondence between the signal data 204 generated by the audio analysis module 202 and threshold data 112(1). The threshold data 112(1) may associate frequencies 206(1) of the audio data 102 with corresponding threshold amplitudes 212. For example, FIG. 2 depicts example threshold data 112(1) that associates a first frequency 206(1) with a first threshold amplitude 212(1), a second frequency 206(2) with a second threshold amplitude 212(2), and any number of additional frequencies 206(N) with corresponding threshold amplitudes 212(N). If the amplitude 208 for a particular frequency 206 is greater than or equal to the threshold amplitude 212 for that frequency 206 indicated in the threshold data 112(1), this determination may indicate that the corresponding portion 106 of the audio data 102 represents sound. If the amplitude 208 for a particular frequency 206 is less than the threshold amplitude 212 for that frequency 206, this may indicate that the corresponding portion 106 of the audio data 102 represents silence. In some cases, a portion 106 of the audio data 102 that represents "silence" may not necessarily include no sound, but may include sound having an amplitude 208 less than a threshold amplitude 212 for one or more frequencies 206. Based on correspondence between the signal data 204 and the threshold data 112(1), the sound determination module 210 may generate a sound determination 214 indicating whether the content for one or more portions 106 of the audio data 102 represents sound or silence.

A content determination module 216 associated with the audio determination module 110 may determine portions 106 of the audio data 102 that represent speech, and portions 106 of the audio data 102 that represent other non-speech sounds. For example, the content determination module 216 may determine correspondence between one or more signal characteristics 218 of one or more portions 106 of the audio data 102 and threshold data 112(2) that associates signal characteristics 218 with content types 220. For example, the threshold data 112(2) may associate a particular content type 220, such as speech, with a corresponding set of signal characteristics 218, such as a pattern of pitches or frequencies, amplitudes, wave shapes, or other characteristics indicative of speech. Similarly, the threshold data 112(2) may associate other content types 220 with other sets of signal characteristics 218. Continuing the example, FIG. 2 depicts example threshold data 112(2) that associates a first content type 220(1) with a first set of signal characteristics 218(1), a second content type 220(2) with a second set of signal characteristics 218(2), and any number of additional content types 220(N) with additional sets of signal characteristics 218(N). In some implementations, the content determination module 216 may determine the content type 220 associated with the portions 106 of the audio data 102 that represent sound and omit analysis of the portions 106 that represent silence. In other implementations, the content determination module 216 may analyze the portions 106 that represent silence, such as to confirm that the signal characteristics 218 associated with the portions 106 are indicative of silence. The content determination module 216 may generate the audio determination 114 that indicates the content type 220 that corresponds to one or more portions 106 of the audio data 102. As described with regard to FIG. 1, the audio determination 114 may be provided to a speech analysis module 116 to determine characteristics of the portions 106 associated with speech.

Figure 3:
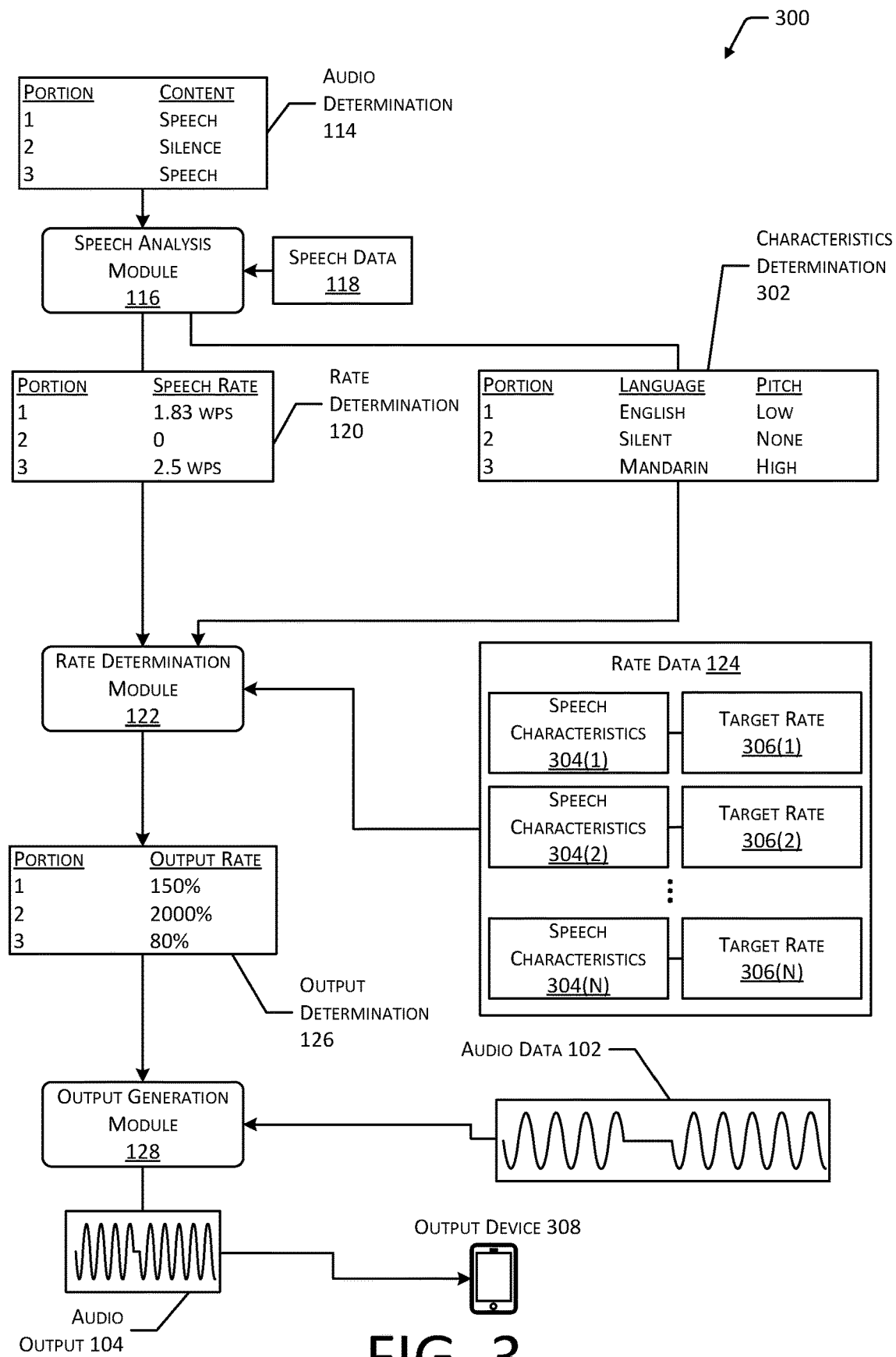
FIG. 3 depicts an implementation of a system for determining an output rate to be used with one or more portions of audio data based on characteristics of the content represented by the audio data.

FIG. 3 depicts an implementation of a system 300 for determining an output rate to be used with one or more portions 106 of audio data 102 based on characteristics of the content represented by the audio data 102. As described with regard to FIGS. 1 and 2, an audio determination module 110 associated with one or more processing servers 108 may generate an audio determination 114 based on characteristics of received audio data 102. The audio determination 114 may indicate portions 106 of the audio data 102 that represent speech, portions 106 that represent silence, and in some cases, portions 106 that represent sounds other than speech.

A speech analysis module 116 may determine correspondence between characteristics of the portions 106 of the audio data 102 that represent speech and speech data 118 to generate a rate determination 120 indicative of a rate of speech associated with one or more of the portions 106. For example, speech data 118 may include one or more rules, algorithms, equations, or other methods by which characteristics of speech, such as variations in amplitude, frequency, or other characteristics, may indicate a rate at which the speech was uttered. In some implementations, the speech analysis module 116 may also generate a characteristics determination 302 indicative of one or more other characteristics of the speech, such as the language that was spoken, the pitch or frequency of the speech, a clarity or annunciation associated with the speech, and so forth. For example, the speech data 118 may also include rules or algorithms for measuring a pitch or frequency of speech, natural language processing or speech to text algorithms for determining annunciation of the speech, and so forth. As another example, the speech data 118 may include language dictionaries or other types of data associating words or phonemes of the speech with corresponding languages. As such, correspondence between portions 106 of the audio data 102 that represent speech and the speech data 118 may indicate particular languages associated with the speech.

As described with regard to FIG. 1, the rate determination module 122 may generate an output determination 126 indicating an output rate to be used when outputting one or more portions 106 of the audio data 102. The output rate for one or more of the portions 106 may be determined based on the rate determination 120, the characteristics determination 302, and rate data 124. For example, the rate data 124 may associate one or more sets of speech characteristics 304 with a corresponding target rate 306 of speech. Speech characteristics 304 may include an amplitude (e.g., volume), pitch, language, rate of speech, and so forth associated with a portion 106 of the audio data 102. Continuing the example, the rate data 124 may indicate that for a first language, such as English, a target rate 306 of speech that may still be comprehended by a user may be five words per second, while for a second language, such as Mandarin, the target rate 306 may be two words per second. As another example, the rate data 124 may indicate target rates 306 that correspond to different pitches or frequencies of speech or other types of speech characteristics 304. FIG. 3 depicts example rate data 124 that associates a first set of speech characteristics 304(1) with a first target rate 306(1) of speech, a second set of speech characteristics 304(2) with a second target rate 306(2), and any number of additional sets of speech characteristics 304(2) with corresponding target rates 306(3). In some implementations, the rate data 124 may include one or more equations, algorithms, rules, weights, and so forth, by which a target rate 306 of speech for a portion 106 may be determined based on specific speech characteristics 304. For example, various particular languages, frequencies or pitches, volumes or amplitudes, or other characteristics of speech may each be associated with a corresponding weight, and the combination of values for multiple determined speech characteristics 304 may be used to calculate the target rate 306 of speech for a portion 106 of the audio data 102. In some implementations, the output determination 126 may indicate an output rate for a portion 106 that is slower than the initial rate of speech associated with the audio data 102. For example, a user that is not fluent in Mandarin may limit the target rate 306 for portions 106 that include Mandarin speech to a rate less than the initial rate of speech for that portion 106.

As described with regard to FIG. 1, the output generation module 128 may generate audio output 104 based on the audio data 102 and the output determination 126, such as by outputting respective portions 106 of the audio data 102 at an output rate indicated in the output determination 126. For example, if the rate determination 120 indicates that an initial rate of speech for a portion 106 is 2.5 words per second, and the rate determination module 122 determines, based on the rate data 124, that a target rate 306 of speech for that portion 106 is 4 words per second, the output determination 126 may indicate that an output rate of 160% may be used so that the portion 106 is output at a rate of approximately 4 words per second. The output generation module 128 may therefore generate audio output 104 in which one or more portions 106 of the audio data 102 are output at an accelerated rate that does not exceed a target rate 306 representing a maximum comprehensible rate for speech. The audio output 104 may be provided to an output device 308 to generate sound for consumption by a user.

Figure 4:
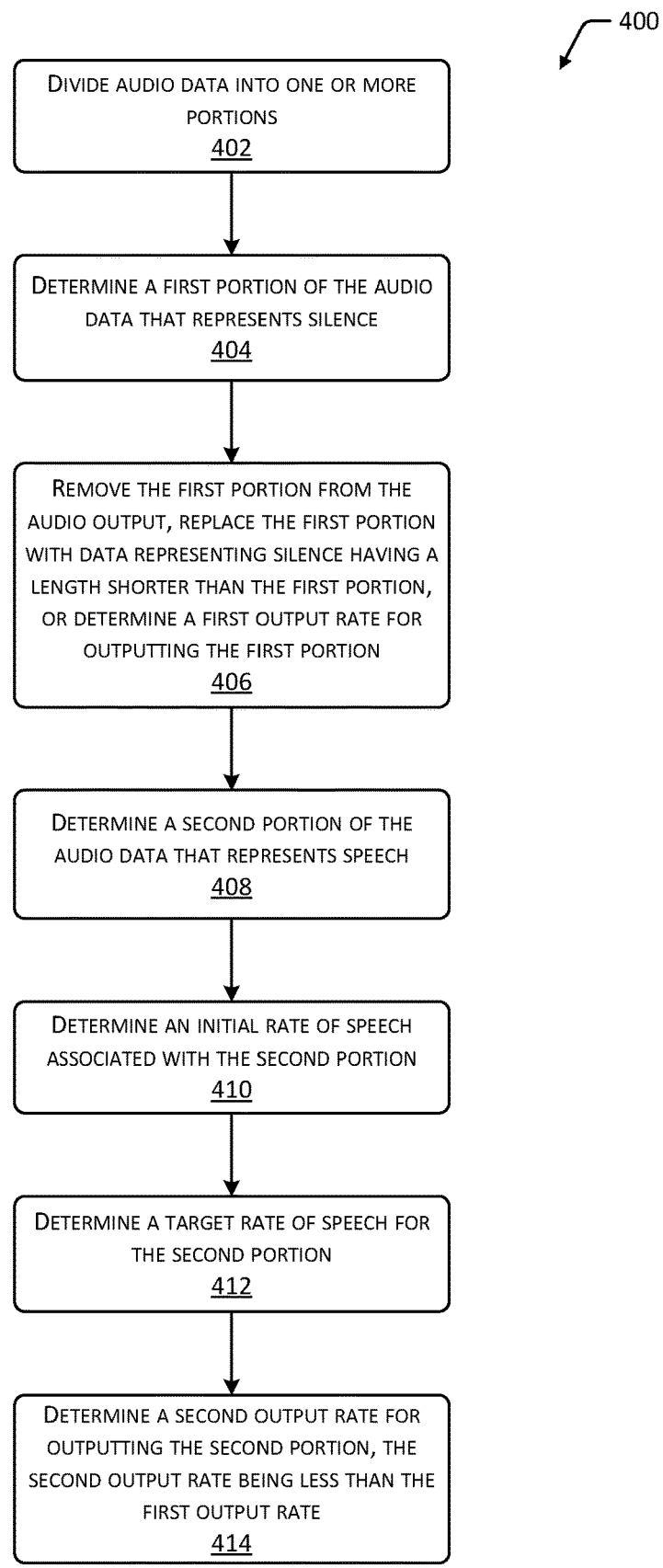
FIG. 4 is a flow diagram depicting an implementation of a method for determining output rates for respective portions of audio data based on the content represented by the audio data.

FIG. 4 is a flow diagram 400 depicting an implementation of a method for determining output rates for respective portions 106 of audio data 102 based on the content represented by the audio data 102. At 402, audio data 102 may be divided into one or more portions 106. As described previously, audio data 102 may indicate the amplitude 208 and other signal characteristics for one or more frequencies 206 over a given period of time. As such, the audio data 102 may represent speech, other non-speech sounds, as well as periods of silence during which the amplitude 208 for one or more frequencies 206 is below a threshold amplitude 212. In some implementations, the audio data 102 may be divided into portions 106 based on the speech characteristics 304 of the audio data 102. For example, a continuous portion 106 of the audio data 102 that represents the same type of content, such as a time period of silence that is uninterrupted by speech or other sound having an amplitude that exceeds a threshold value may be designated as a first portion 106, while a portion 106 where speech occurs that is not separated by an interval of silence greater than a threshold length may be designated as a second portion 106. In some implementations, portions 106 of audio data 102 that represent sound other than speech may be processed in the same manner as silence. In other implementations, portions 106 of audio data 102 that represent sound other than speech may be processed in a unique manner, such as by determining an output rate for the sounds that differs from the output rates used for portions 106 that represent speech or silence.

In other implementations, the audio data 102 may be divided into portions 106 based on the length of time associated with each portion 106. For example, a portion 106 of the audio data 102 may include data associated with a playback time of one second, when output at the default output rate for the audio data 102. As such, the audio data 102 may be divided into portions 106 that are each associated with uniform or non-uniform playback times, and each portion 106 may be output at a different output rate based on the content associated with the portion 106.

At 404, a first portion 106(1) of the audio data 102 that represents silence may be determined. As described with regard to FIGS. 1 and 2, a portion 106 of the audio data 102 in which the amplitude 208 for one or more frequencies 206 does not exceed a threshold amplitude 212 may be determined to represent silence. In some implementations, an audio determination module 110 may determine correspondence between characteristics of the audio data 102 and threshold data 112 to generate an audio determination 114 that indicates one or more portions 106 associated with silence.

At 406 an action may be performed with regard to the portion 106 of the audio data 102 that represents silence. Specifically, the first portion 106 may be removed from the audio output 104, replaced with data representing silence having a length shorter than the length of the first portion 106, or a first output rate for outputting the first portion 106 may be determined. For example, an interval of silence having a length greater than a threshold length may be removed from audio output 104 or replaced with an interval of silence having a shorter length. In other cases, the interval of silence may be output using an accelerated output rate. As described with regard to FIGS. 1 and 3, rate data 124 may indicate a target output rate based on characteristics of a portion 106 of the audio data 102. For example, the target output rate for a portion 106 that represents silence may be greater than a target output rate for a portion 106 that represents speech due to the ability to omit or greatly shorten the duration during which a user is exposed to silence without hindering the ability of the user to comprehend the content.

At 408, a second portion 106(2) of the audio data 102 that represents speech may be determined. As described with regard to FIGS. 1 and 2, a portion 106 of the audio data 102 in which the amplitude 208 for one or more frequencies 206 is greater than or equal to a threshold amplitude 212 may be determined to represent sound. Based on signal characteristics 218 for portions 106 of the audio data 102 that represent sound, portions 106 that represent speech may be differentiated from portions 106 that represent other non-speech sounds.

At 410, an initial rate of speech associated with the second portion 106 may be determined. For example, characteristics of the portion 106, such as a sample rate, a zero-crossing rate, a rate at which the frequency 206 or amplitude 208 of a signal represented by the portion 106 varies to indicate the presence of sound, and so forth, may be used to determine a rate of speech for the portion 106. Rates of speech may be expressed as words, syllables, or phonemes per unit of time. The initial rate of speech associated with a portion 106 may be used to determine the output rate for that portion 106. For example, if a portion 106 of the audio data 102 corresponds to rapid speech, outputting the rapid speech at a high output rate may hinder comprehensibility of the speech. Conversely, if a portion 106 corresponds to slow speech, outputting the slow speech at a high output rate may increase the efficiency at which the content is consumed without hindering comprehensibility.

At 412, a target rate 306 of speech for the second portion 106 may be determined. As described with regard to FIGS. 1 and 3, rate data 124 may associate target rates 306 of speech with corresponding sets of speech characteristics 304. Correspondence between the portion 106 of the audio data 102 and speech data 118 may be used to determine characteristics associated with the speech, in addition to the initial rate of speech associated with the portion 106. The target rate 306 of speech may be selected based on one or more of the language, pitch or frequency, volume or amplitude, or other speech characteristics 304, such as the annunciation of a speaker, the presence of background noise, and so forth. In some implementations, the target rate 306 may be selected based at least in part on user input. For example, a user that is less familiar with the Mandarin language than the English language may select a target rate 306 for Mandarin that is less than the target rate 306 for English.

At 414, a second output rate for outputting the second portion 106 may be determined, the second output rate being less than the first output rate associated with the first portion 106 that represents silence. For example, based on a relationship between the target rate 306 and the initial rate of speech for a portion 106 of the audio data 102, an output rate that will cause the portion 106 to be output within a threshold variation of the target rate 306 may be determined. Output of the portion 106 at or near the target rate 306 may increase the rate at which a user consumes content while maintaining comprehensibility of the speech. Outputting of the portion 106 representing silence at a greater output rate may minimize the time that a user is exposed to silence, increasing the rate at which the content may be consumed.

Figure 5:
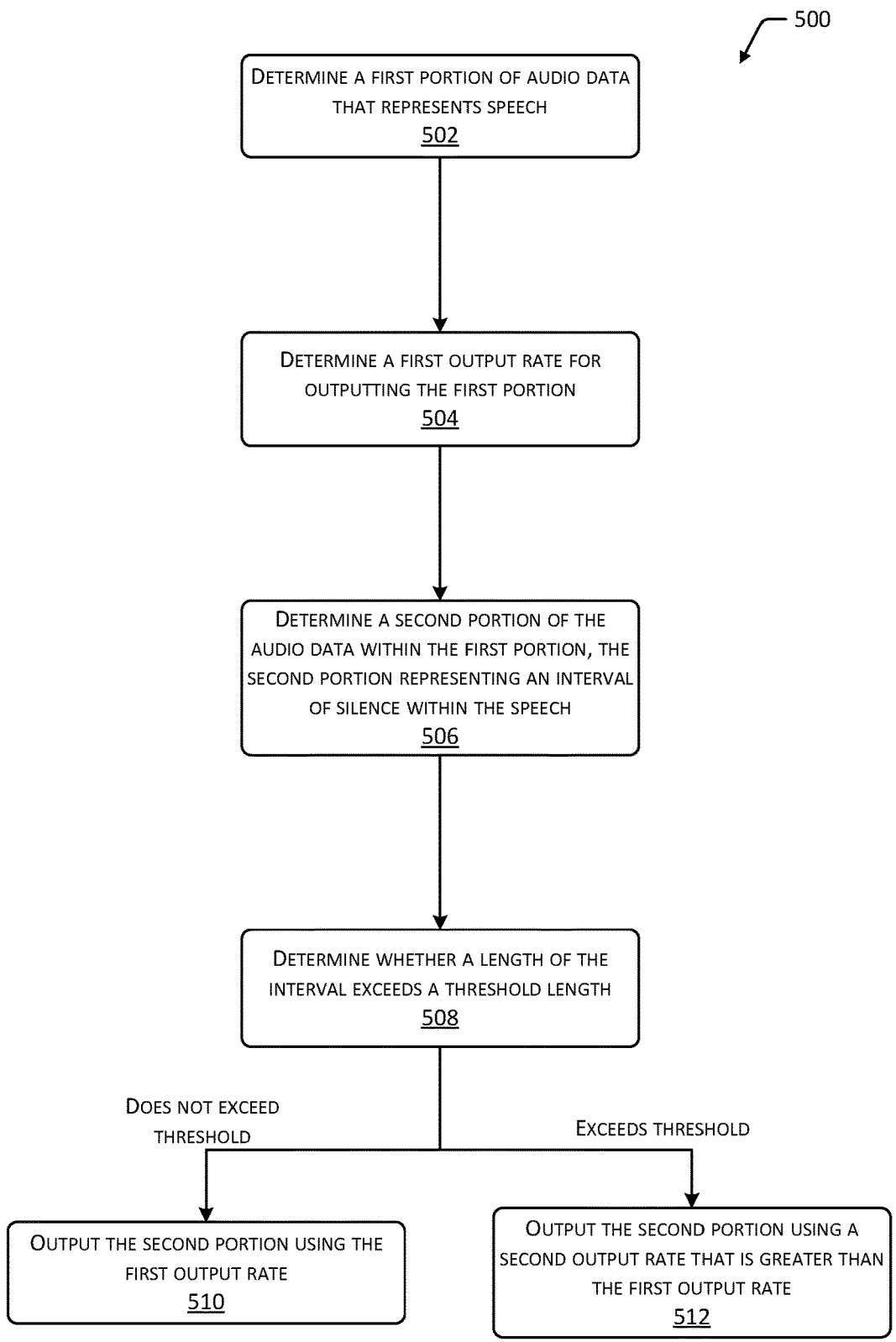
FIG. 5 is a flow diagram depicting an implementation of a method for determining output rates for portions of audio data representing an interval of silence within speech.

FIG. 5 is a flow diagram 500 depicting an implementation of a method for determining output rates for portions 106 of audio data 102 representing an interval of silence within speech. For example, some portions 106 of the audio data 102 that represent silence may indicate portions 106 that do not convey substantive information to a user. However, other portions 106 that represent a smaller interval of silence may represent a natural pause in a speaker's speech. In such a case, omitting the smaller interval of silence or outputting the interval of silence using a greater output rate than that used to output the speech may hinder the user experience and user comprehension when listening to the speech. As such, the smaller interval of silence may be output using the same output rate associated with the speech, or a different output rate that is less than the output rate associated with portions 106 of the audio data 102 that represent silence.

At 502, a first portion 106 of audio data 102 that represents speech may be determined. As described previously, audio data 102 may be analyzed to determine portions 106 having an amplitude 208 greater than or equal to a threshold amplitude 212 for one or more frequencies 206, such as frequencies 206 within the human audible range. The characteristics of the audio signal associated with these portions 106 may be analyzed to determine portions 106 that represent speech as opposed to other non-speech sounds.

At 504, a first output rate for outputting the first portion 106 may be determined. As described with regard to FIGS. 1-4, an output rate for a portion 106 of audio data 102 that represents speech may be determined based on the initial rate of speech for the portion 106 and one or more speech characteristics 304, such as the pitch, volume, or language associated with the speech. A target rate 306 of speech for the portion 106 may be determined based on the speech characteristics 304, and an output rate may be determined based on the relationship between the initial rate of speech and the target rate 306 of speech.

At 506, a second portion 106 of the audio data 102, within the first portion 106, may be determined, the second portion 160 representing an interval of silence within the speech. For example, a lengthy interval of silence may represent a break between speakers or speeches. However, a brief interval of silence may represent a natural pause in the speech of a single speaker. As such, at 508, a determination may be made as to whether a length of the interval of silence exceeds a threshold length. The threshold length may be a length of time associated with typical pauses in speech. In some implementations, the threshold length may be determined based on the language associated with the speech. For example, some languages or dialects may include more lengthy pauses than other languages or dialects.

If the length of the interval does not exceed the threshold length, then at 510, the second portion 106 may be output using the first output rate. For example, an interval of silence within a speech may be output using the same output rate as that used to output the speech. However, if the length of the interval exceeds the threshold length, then at 512, the second portion 106 may be output using a second output rate that is greater than the first output rate. For example, outputting the interval of silence at a greater output rate than that at which the speech is output may decrease the time during which a user is exposed to silence and increase the rate at which content is consumed by the user. In some implementations, the second output rate may be equal to an output rate that other periods of silence that are not within the first portion 106 are output. In other implementations, the second output rate may be greater than the first output rate, but less than an output rate used for other portions 106 that represent silence.

Figure 6:
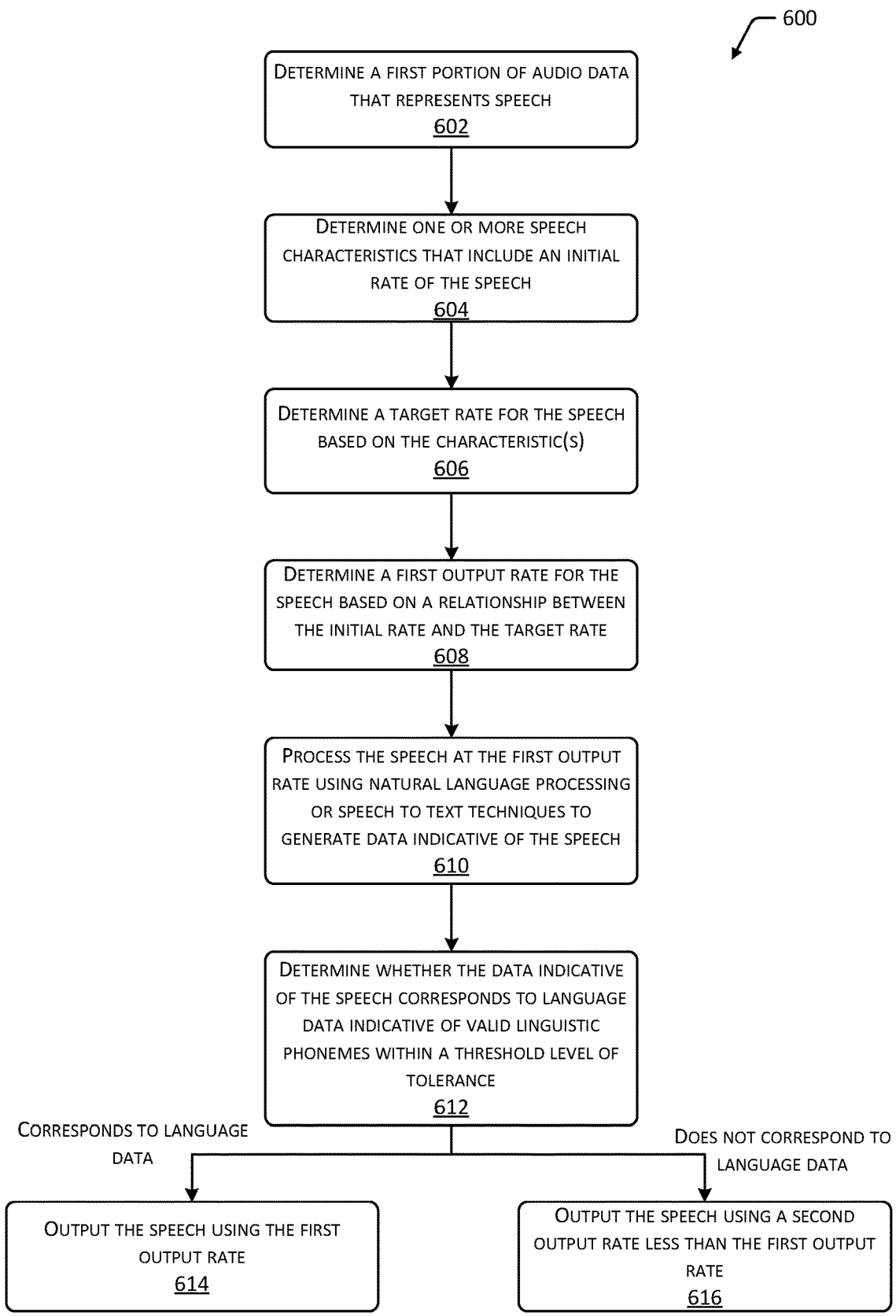
FIG. 6 is a flow diagram depicting an implementation of a method for determining whether use of a determined output rate with a portion of audio data results in a comprehensible audio output.

FIG. 6 is a flow diagram 600 depicting an implementation of a method for determining whether use of a determined output rate with a portion 106 of audio data 102 results in a comprehensible audio output 104. At 602, a first portion 106 of audio data 102 that represents speech may be determined. As described with regard to FIGS. 1-5, a portion 106 of audio data 102 that represents a signal having an amplitude 208 greater than a threshold for one or more frequencies 206 within the human audible range may be determined to represent sound. Based on the characteristics of the sound represented by the portion 106, the sound may be determined to include speech, rather than other non-speech sounds.

At 604, one or more speech characteristics 304, that include an initial rate of the speech, may be determined. For example, characteristics of the portion 106 of the audio data 102, such as a sample rate, a zero-crossing rate, a rate at which the frequency 206 or amplitude 208 of a signal represented by the portion 106 varies to indicate the presence of sound, and so forth, may be used to determine a rate of speech for the portion 106. Rates of speech may be expressed as words, syllables, or phonemes per unit of time, or other measurements.

At 606, a target rate 306 for the speech may be determined based on the characteristics of the speech. For example, determined characteristics of the speech may also include a language associated with the speech, a volume or amplitude 208 of the speech, a pitch or frequency 206 of the speech, and so forth. Rate data 124 may associate sets of speech characteristics 304 with corresponding target rates 306 of speech. In some implementations, rate data 124 may include one or more weights, equations, or algorithms that may be used to determine a target rate 306 for speech based on the various speech characteristics 304 and in some cases, user input.

At 608, a first output rate for the speech may be determined based on a relationship between the initial rate and the target rate 306. For example, an output rate for the speech may be within a threshold variance of the quotient of the target rate 306 and the initial rate.

At 610, the speech may be processed, at the first output rate, using natural language processing or speech to text techniques to generate data indicative of the speech. For example, natural language processing or speech to text processing may generate text data or another type of data representing the speech. Data indicative of the speech may be used to determine whether the speech, when output at the determined output rate, would be comprehensible to a user. In some implementations, the speech may be processed without necessarily outputting the speech. For example, natural language processing techniques may be used without necessarily generating audible output using an output device 308. In other implementations, audible output of the speech may be analyzed using natural language processing or speech to text techniques.

At 612, a determination may be made as to whether the data indicative of the speech corresponds to language data indicative of valid linguistic phonemes within a threshold level of tolerance. For example, language data may indicate valid phonemes for a particular language associated with the speech. If the data indicative of the speech, determined at 610, corresponds to the language data, this may indicate that the speech, when output at the determined output rate, includes valid linguistic phonemes. If more than a threshold amount of the speech does not correspond to the language data, this may indicate that at least the threshold amount of the speech would not be comprehensible to a user.

If the data indicative of the speech corresponds to the language data, at 614, the speech may be output using the first output rate. However, if the data indicative of the speech does not correspond to the language data within the threshold tolerance, at 616 the speech may be output using a second output rate that is less than the first output rate to improve comprehensibility of the speech. In some implementations, the process described with regard to FIG. 6 may be performed using the second output rate to determine whether use of the second output rate results in a comprehensible output.

Figure 7:
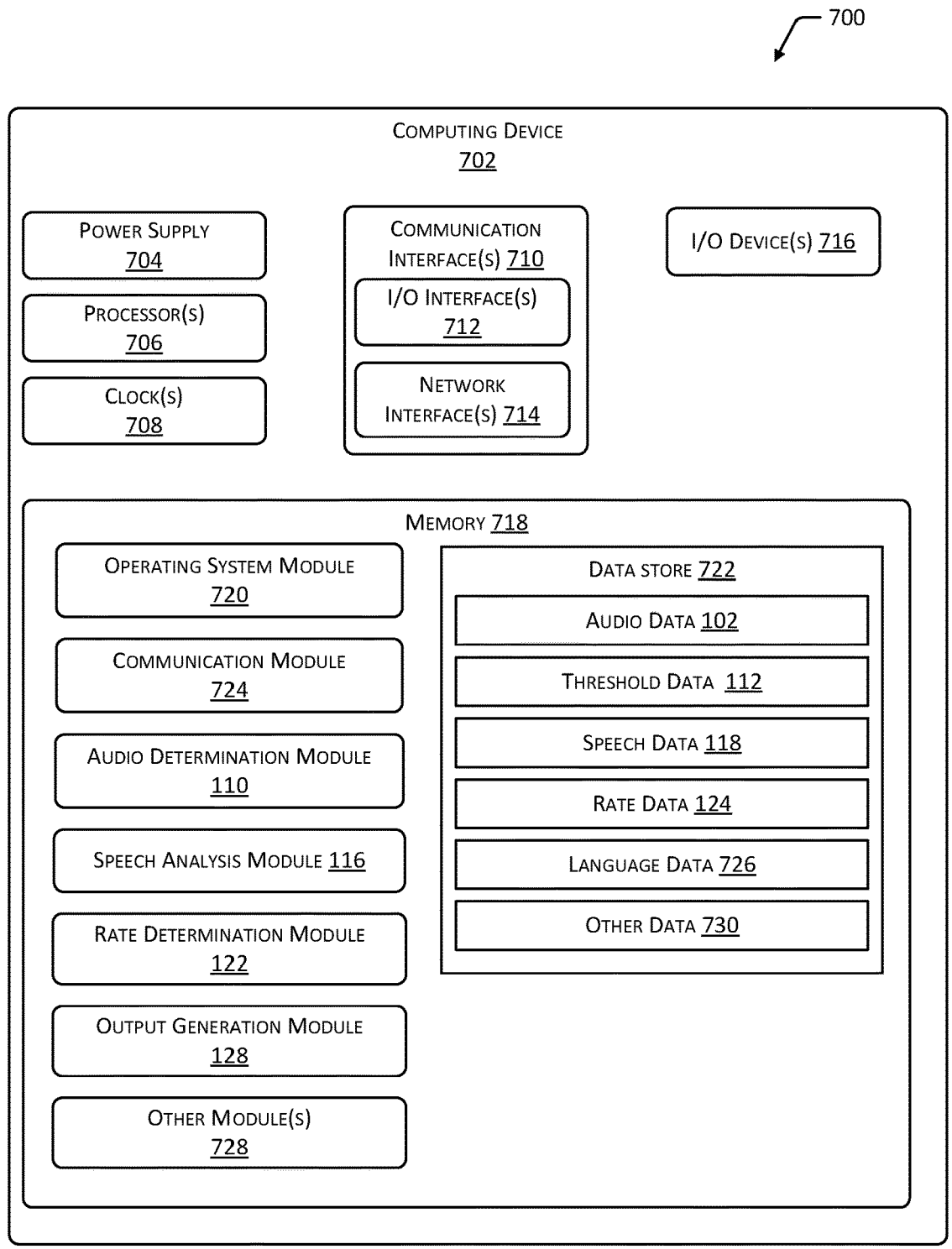
FIG. 7 is a block diagram depicting an implementation of a computing device within the scope of the present disclosure.

FIG. 7 is a block diagram 700 depicting an implementation of a computing device 702 within the scope of the present disclosure. The computing device 702 may include one or more processing servers 108, output devices 308, sources of audio data 102, or other computing devices 702 in communication with one or more of the processing servers 108, output devices 308, or data sources. While FIG. 7 depicts a single block diagram 700 representative of a computing device 702, any number of networked computing devices 702 may perform the implementations described herein.

One or more power supplies 704 may be configured to provide electrical power suitable for operating the components of the computing device 702. In some implementations, the power supply 704 may include a rechargeable battery, fuel cell, photovoltaic cell, power conditioning circuitry, and so forth.

The computing device 702 may include one or more hardware processor(s) 706 (processors) configured to execute one or more stored instructions. The processor(s) 706 may include one or more cores. One or more clock(s) 708 may provide information indicative of date, time, ticks, and so forth. For example, the processor(s) 706 may use data from the clock 708 to generate a timestamp, trigger a preprogrammed action, and so forth.

The computing device 702 may include one or more communication interfaces 710, such as input/output (I/O) interfaces 712, network interfaces 714, and so forth. The communication interfaces 710 may enable the computing device 702, or components of the computing device 702, to communicate with other computing devices 702 or components of the other computing devices 702. The I/O interfaces 712 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 712 may couple to one or more I/O devices 716. The I/O devices 716 may include any manner of input device or output device associated with the computing device 702. For example, I/O devices 716 may include touch sensors, keyboards, mouse devices, microphones, image sensors (e.g., cameras), scanners, displays, speakers, haptic devices, printers, weight sensors, code reading devices, Radio Frequency Identification (RFID) devices, Near Field Communication (NFC) devices, and so forth. In some implementations, the I/O devices 716 may be physically incorporated with the computing device 702 or may be externally placed.

The network interfaces 714 may be configured to provide communications between the computing device 702 and other devices, such as the I/O devices 716, routers, access points, and so forth. The network interfaces 714 may include devices configured to couple to one or more networks including local area networks (LANs), wireless LANs (WLANs), wide area networks (WANs), wireless WANs, and so forth. For example, the network interfaces 714 may include devices compatible with Ethernet, Wi-Fi, Bluetooth, ZigBee, Z-Wave, 3G, 4G, LTE, and so forth.

The computing device 702 may include one or more busses or other internal communications hardware or software that allows for the transfer of data between the various modules and components of the computing device 702.

As shown in FIG. 7, the computing device 702 may include one or more memories 718. The memory 718 may include one or more computer-readable storage media (CRSM). The CRSM may be any one or more of an electronic storage medium, a magnetic storage medium, an optical storage medium, a quantum storage medium, a mechanical computer storage medium, and so forth. The memory 718 may provide storage of computer-readable instructions, data structures, program modules, and other data for the operation of the computing device 702. A few example modules are shown stored in the memory 718, although the same functionality may alternatively be implemented in hardware, firmware, or as a system on a chip (SoC).

The memory 718 may include one or more operating system (OS) modules 720. The OS module 720 may be configured to manage hardware resource devices such as the I/O interfaces 712, the network interfaces 714, the I/O devices 716, and to provide various services to applications or modules executing on the processors 706. The OS module 720 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 722 and one or more of the following modules may also be associated with the memory 718. The modules may be executed as foreground applications, background tasks, daemons, and so forth. The data store(s) 722 may use a flat file, database, linked list, tree, executable code, script, or other data structure to store information. In some implementations, the data store(s) 722 or a portion of the data store(s) 722 may be distributed across one or more other devices including other computing devices 702, network attached storage devices, and so forth.

A communication module 724 may be configured to establish communications with one or more other computing devices 702. Communications may be authenticated, encrypted, and so forth.

The memory 718 may also store the audio determination module 110. The audio determination module 110 may determine portions 106 of audio data 102 that represent silence, and portions 106 that represent sound. In some implementations, the audio determination module 110 may divide audio data 102 into portions 106 based on the presence of silence or sound. For example, audio data 102 representing sound that is separated from other audio data 102 representing sound by an interval of silence of a least a threshold length may constitute a first portion 106 of the audio data 102, the interval of silence may constitute a second portion 106, and the second interval of sound may constitute a third portion 106. The audio determination module 110 may also determine portions 106 of the audio data 102 that represent speech, as opposed to other sounds, based on characteristics of the audio data 102. For example, the audio determination module 110 may determine an amplitude 208 or other measurement of the signal represented by a portion of the audio data 106 relative to a threshold amplitude 212 indicated in threshold data 112, as well as other signal characteristics 218 that may indicate speech.

The memory 718 may additionally store the speech analysis module 116. The speech analysis module 116 may determine an initial rate of speech associated with portions 106 of the audio data 102 that represent speech. In some implementations, the speech analysis module 116 may determine other characteristics of the portions 106 of the audio data 102, such as amplitude 208 or volume, pitch or frequency 206, a language associated with speech, and so forth. For example, the speech analysis module 116 may determine correspondence between one or more portions 106 of the audio data 102 and speech data 118 to determine speech characteristics 304.

The memory 718 may further store the rate determination module 122. The rate determination module 122 may determine an output rate to be used for one or more portions 106 of the audio data 102 based on one or more of a determined initial rate of speech for a portion 106, the speech characteristics 304 for that portion, and rate data 124 that associates sets of speech characteristics 304 with a target rate 306 of speech. The output rate used for a portion 106 of the audio data 102 may be determined based on a relationship between the target rate 306 and the initial rate of the speech. In some implementations, rate data 124 may also indicate target rates 306 or rules for determining output rates for portions 106 of the audio data 102 that represent silence or non-speech sounds.

The memory may also store the output generation module 128, which may generate audio output 104 based on the audio data 102 and the determined output rates for one or more portions 106 of the audio data 102. In some implementations, the output generation module 128, or another module associated with the computing device 702, may analyze the audio output 104 to determine comprehensibility of the output. For example, natural language processing or speech-to-text processing may be used to generate data indicative of speech that is output using the determined output rate. Correspondence between the data indicative of the speech and language data 726 indicative of valid linguistic phonemes may be used to determine whether the speech includes comprehensible linguistic phonemes.

Other modules 728 may also be present in the memory 718. For example, encryption modules may be used to encrypt and decrypt communications between computing devices 702. Authentication modules may be used to authenticate communications sent or received by computing devices 702. Other modules 728 may also include modules for detecting characteristics of a computing device 702, such as characteristics of an output device 308 that may affect the manner in which audio output 104 may be processed or generated.

Other data 730 within the data store(s) 722 may include user input data, such as configurations, settings, preferences, and default values associated with computing devices 702. Other data 730 may include encryption keys and schema, access credentials, and so forth.

In different implementations, different computing devices 702 may have different capabilities or capacities. For example, processing servers 108 may have greater processing capabilities or data storage capacity than output devices 308.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
access an audio data file associated with a first audio output rate, wherein presentation of the audio data file at the first audio output rate is associated with a first output time;
determine a first portion of the audio data file that represents first speech;
determine a second portion of the audio data file that represents first silence, wherein the second portion is subsequent to the first portion;
determine that a length of the second portion is greater than a threshold length;
determine a third portion of the audio data file that represents one or more of:
non-speech sound, or
second silence having a length less than the threshold length;
determine a second audio output rate associated with output of the first speech, wherein the second audio output rate is greater than the first audio output rate;
determine a third audio output rate associated with output of the one or more of the non-speech sound or the second silence, wherein the third audio output rate is greater than the second audio output rate;
determine a fourth audio output rate associated with output of the first silence, wherein the fourth audio output rate is greater than the second audio output rate and the third audio output rate; and
output the first portion of the audio data file at the second audio output rate, the second portion of the audio data file at the third audio output rate, and the third portion of the audio data file at the fourth audio output rate, wherein outputting the audio data file using the second audio output rate, the third audio output rate, and the fourth audio output rate is associated with a second output time that is shorter than the first output time.

2. The system of claim 1, further comprising computer-executable instructions to:
determine an initial rate of speech associated with the first speech represented by the first portion of the audio data file;
access a target rate of speech associated with comprehensible output; and
determine the second audio output rate for outputting the first portion of the audio data file based on a relationship between the target rate of speech and the initial rate of speech, wherein outputting the first portion of the audio data file at the second audio output rate outputs the first speech at the target rate of speech.

3. The system of claim 1, further comprising computer-executable instructions to:
process audio output associated with the output of the first portion of the audio data file at the second audio output rate using natural language processing;
determine, based on correspondence between the audio output and language data indicative of valid linguistic phonemes, at least one sound in the audio output that is not associated with a valid linguistic phoneme; and
based on the correspondence, decrease the second audio output rate.

4. The system of claim 1, further comprising computer-executable instructions to:
determine a fourth portion of the audio data file within the first portion, wherein the fourth portion corresponds to an interval of silence in the first speech;
determine that a length of the interval is less than a threshold length; and
in response to the length of the interval being less than the threshold length, output the fourth portion of the audio data file at one or more of the first audio output rate, the second audio output rate, or a fifth audio output rate that is greater than the first audio output rate and less than the second audio output rate.

5. A method comprising:
determining a first portion of audio data that corresponds to speech;
determining a speech characteristic associated with the speech of the first portion;
determining a target rate of speech based on the speech characteristic;
determining a first output rate for the first portion of the audio data;
outputting the first portion of the audio data at the first output rate, wherein the outputting of the first portion of the audio data at the first output rate causes output of audio representing the speech at a rate within a threshold tolerance of the target rate of speech;
determining a plurality of phonemes of the speech using one or more of: natural language processing or speech to text processing;
determining a lack of correspondence between at least one phoneme of the plurality of phonemes and language data indicative of valid linguistic phonemes; and
based on the lack of correspondence, modifying the first output rate.

6. The method of claim 5, further comprising:
determining a second portion of the audio data that corresponds to silence; and
one or more of removing the second portion from the audio data or replacing the second portion with a third portion having a first length less than a second length of the second portion.

7. The method of claim 5, further comprising:
determining a second portion of the audio data that corresponds to one or more of silence or non-speech sound; and
determining a second output rate for the second portion of the audio data, wherein the second output rate is greater than the first output rate.

8. The method of claim 5, wherein the speech characteristic includes a language associated with the speech, the method further comprising determining the target rate of speech based on the language.

9. The method of claim 5, further comprising:
receiving user input indicating a target playback time for the audio data;
determining an initial playback time for playback of the audio data at an initial output rate;
determining a relationship between the initial playback time and the target playback time; and
based on the relationship between the initial playback time and the target playback time, determining the first output rate, wherein the audio data is output at the first output rate for a length of time within a threshold tolerance of the target playback time.

10. The method of claim 5, further comprising:
determining a second portion of the audio data within the first portion, wherein the second portion corresponds to an interval of silence in the speech;
determining a length of the interval; and
based on correspondence between the length of the interval and a threshold length, determining a second output rate for the second portion.

11. The method of claim 5, further comprising:
determining a second portion of the audio data that corresponds to silence having a length greater than a threshold length;
determining a third portion of the audio data that corresponds to one or more of non-speech sound or silence having a length less than the threshold length;
determining a second output rate for the second portion of the audio data, wherein the second output rate is greater than the first output rate; and
determining a third output rate for the third portion of the audio data, wherein the third output rate is greater than the first output rate and less than the second output rate.

12. The method of claim 5, further comprising:
receiving user input indicating a second portion within the first portion as incomprehensible; and
in response to the user input, determining a second output rate for the second portion, wherein the second output rate is less than the first output rate.

13. A system comprising:
one or more memories storing computer-executable instructions; and
one or more hardware processors to execute the computer-executable instructions to:
  determine a first portion of audio data that corresponds to speech;
  determine a second portion of the audio data that corresponds to first non-speech;
  determine a third portion of the audio data that corresponds to second non-speech;
  determine a first output rate for presentation of the first portion of the audio data;
  determine a second output rate for presentation of the second portion of the audio data, wherein the second output rate is greater than the first output rate; and
  determine a third output rate for presentation of the third portion of the audio data, wherein the third output rate is greater than the second output rate.

14. The system of claim 13, further comprising computer-executable instructions to:
determine an initial output rate associated with the audio data; and
determine the first output rate based on the initial output rate, wherein the first output rate is greater than the initial output rate.

15. The system of claim 13, further comprising computer-executable instructions to:
determine an initial rate of speech associated with the first portion of the audio data;
determine a target rate of speech; and
determine the first output rate based on the initial rate of speech and the target rate of speech.

16. The system of claim 13, further comprising computer-executable instructions to:
determine a fourth portion of the audio data within the first portion, wherein the fourth portion corresponds to an interval of silence in the speech;
determine that a length of the interval is less than a threshold length; and
output the fourth portion at the first output rate.

17. The system of claim 13, further comprising computer-executable instructions to:
determine that the second portion of the audio data corresponds to an interval of silence in the speech that corresponds to the first portion; and
determine that a length of the interval is greater than a threshold length;
wherein the second output rate is determined in response to the length of the interval being greater than the threshold length.

18. The system of claim 13, further comprising computer-executable instructions to:
output the first portion of the audio data at the first output rate;
begin outputting the second portion of the audio data at the first output rate; and
gradually increase the outputting of the second portion to the second output rate.

19. The system of claim 13, further comprising computer-executable instructions to:
output the first portion of the audio data as audio representing the speech;
process the audio using one or more of natural language processing or speech to text processing to determine a plurality of phonemes based on the speech;
determine a lack of correspondence between at least one phoneme of the plurality of phonemes and language data indicative of valid linguistic phonemes; and
based on the lack of correspondence, modify the first output rate.

20. The system of claim 13, further comprising computer-executable instructions to:
determine one or more speech characteristics associated with the first portion of the audio data; and
based on the one or more speech characteristics, determine the first output rate.

* * * * *